United States Patent Office 3,409,640
Patented Nov. 5, 1968

3,409,640
5-(3'-DIMETHYLAMINO-2'-METHYL-PROPYL) DIBENZOCYCLOHEPTENES
Frank J. Villani, West Caldwell, N.J., assignor to Schering Corporation, Bloomfield, N.J., a corporation of New Jersey
No Drawing. Filed July 22, 1959, Ser. No. 828,722
1 Claim. (Cl. 260—370.8)

This invention relates to a novel class of organic compounds possessing valuable physiological activity. More specifically my invention relates to novel derivatives of dibenzocycloheptadiene and of dibenzocycloheptatriene, to valuable intermediates for the preparation thereof, and to novel processes related thereto.

The system of nomenclature employed throughout the instant application is in accordance with that as employed by the Subject Index of Chemical Abstracts (1956) wherein the compounds are named in the following manner as derivatives of cycloheptanes:

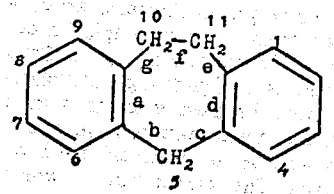

Ia
Dibenzo[a,d][1,4]cycloheptadiene
Dibenzo[a,e]cycloheptatriene

The letters enclosed within the brackets refer to the sides of the respective cycloheptatriene and [1,4]cycloheptatriene nuclei to which the benzene rings are fused. The numbers designate the positions at which substituents are attached to the fused ring system. It is to be noted that in Formula Ia, the lettering of the sides of the cycloheptadiene ring proceeds counterclockwise while in Ib, a cycloheptatriene, the lettering proceeds clockwise.

My compounds are of the group consisting of bases having the following formula and the acid addition salts thereof:

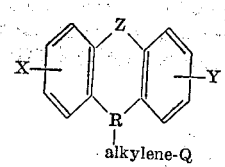

wherein X and Y represent hydrogen, halogen, hydroxy, alkoxy, alkyl, or alkanoyloxy; Z reperents 1,2-lower alkylene or 1,2-lower alkylvinylene; R represents

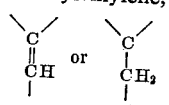

Q represents tertiary amine.

When any of the substituents X, Y, R, or Q comprise a carbon chain, either in part or in entirety, as indicated by the term "alkyl" or by a term derived from "alkyl," e.g. alkoxy, alkanoyloxy, thioalkyl; said carbon chain may contain from 1 to 4 carbon atoms inclusive and may be arranged either in a straight or branched chain. Typical of such alkyl groups are methyl, ethyl, propyl, isopropyl, butyl, isobutyl, t-butyl and the like. Typical of those groups which contain alkyl groups are methoxy, thiomethyl, ethoxy, thioethyl, acetyl, propoxy, isopropoxy, thiopropyl, butyryloxy, propionyloxy, and the like.

Embraced by the group Z are hydrocarbon chains of two to six carbon atoms being joined to the two benzo moieties by a single bond from the first carbon atom of the chain and by a single bond from the second carbon atom; and which may possess an olefinic bond between the first and second atom of the hydrocarbon chain. When such optional unsaturation is present in the Z, it is indicated by the term 1,2-lower vinylene. Typical of the groups embraced by the term 1,2-lower vinylene are

and

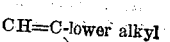

Those groups embraced by the term 1,2-lower alkylene include

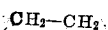

and

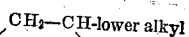

Those tertiary amine substituents which are represented by the term Q include dialkylamino groups such as dimethylamino, diethylamino, methylethylamino, dibutylamino; cycloamino groups such as pyrrolidino, piperidino, piperazino; substituted cycloamino groups such as N-methyl piperazino, N-hydroxyethyl piperazino and the like.

Either or both of the two benzo moieties may be substituted or unsubstituted as designated in the above formula by groups X and Y. Representative of this substitution are such groups as chlorine, methyl, ethyl, methoxy, hydroxy, acetate, bromine, propionate, butyl and and the like as well as groups such as trifluoromethyl, thiomethyl, amino and the like.

Representative of the compounds of my invention are compounds such as 5-(3-dimethylaminopropyl)-dibenzo[a,e]-cycloheptatriene;
5-(2-piperidinoethyl)-dibenzo[a,e]cycloheptatriene;
5-(3-N-methylhomopiperazinopropyl)-dibenzo[a,e]-cycloheptatriene;
5-(3-dimethylaminopropyl)-dibenzo[a,d][1,4]-cycloheptadiene;
5-[4-(N-[2-hydroxyethyl]-piperazino)-butyl]-dibenzo[a,e]cycloheptatriene;
5-(3-dimethylaminopropyl)-10-methyldibenzo[a,d,][1,4]cycloheptadiene;
3-chloro-5-(3-dimethylaminopropyl)-dibenzo[a,e,]cycloheptatriene;
3-methoxy-5-(3-dimethylaminopropyl)-dibenzo[a,e]cycloheptatriene;
3,7-dichloro-5-(3-dimethylaminopropyl)-dibenzo[a,e]cycloheptatriene;
5-(3-dimethylaminopropylidene)-dibenzo[a,d][1,4]cycloheptadiene;
3-chloro-5-(3-dimethylaminopropylidene)-dibenzo[a,d][1,4]cycloheptadiene and the like.

The novel compounds of my invention in their effect upon the central nervous system cause a stimulatory mood elevation with few if any side effects. The compounds are accordingly useful in a diversity of depressed states such as fatigue and depression arising from convalescence, schizophrenia, geriatric depression, narcolepsy, and the like. In addition, depending upon the various substituents present, the compounds exhibit valuable antihistamic, antitremulant and parasympathetic blocking properties.

My compounds are preferably administered orally in the form of capsules, tablets, elixers and the like. In those instances where parenteral injection is indicated, the compounds may be so applied in the form of sterile solutions or suspensions.

There exist a wide selection of preparatory routes applicable to my novel compounds, the specific method being determined by the substituents to be present in the final compound. Intermediates valuable in the preparation of the final compounds are polycyclic substances having the following structural formula:

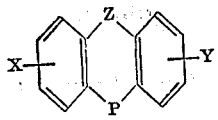

III wherein X, Y and Z are as previously described and P represents methylene (—CH$_2$—) or carbonyl

The requisite intermediates are prepared via ring closure reactions, which, depending upon the specific reactant, are carried out according to one of several reaction sequences. For example the ring closure may be effected on a 2-phenylethylbenzoic acid (IV) by employing a condensing agent such as polyphosphoric acid as follows:

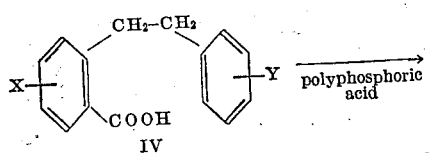

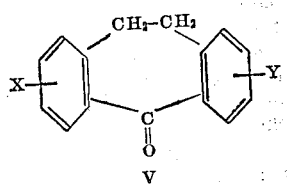

Ring closure is also effected by other condensing agents of the Lewis acid type such as aluminum chloride, hydrogen fluoride, boron trifluoride, stannic chloride and the like. When employing these latter reagents it is often advantageous to use the acid chloride of IV rather than the free acid. Thus for example a cis 2-styrylbenzoyl chloride (VI) upon catalysis with aluminum chloride in the known Friedel-Crafts type reaction forms dibenzo [a, e] cycloheptatriene-5-one as follows:

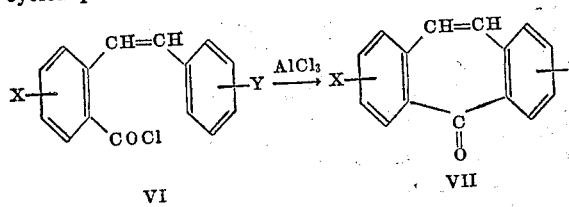

In the foregoing reactions ring closure is effected so as to form a one carbon bridge between the two aromatic nuclei in addition to the already existent 2 carbon bridge. Analogous condensations will also occur with 2-benzylphenylacetic acid compounds so as to form the two carbon bridge in addition to an already existent one carbon bridge. For example, a 2-benzylphenylacetyl chloride (VIII) cyclizes to form a dibenzo[a,d][1,4]cycloheptadiene-10-one (IX) upon treatment with aluminum chloride as follows:

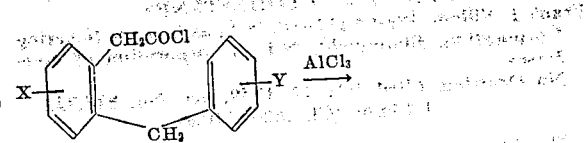

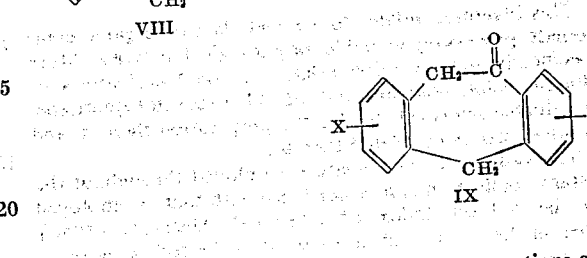

The conditions for the above ring closure reactions are similar to those generally employed in Friedel-Craft condensations. A solvent may or may not be employed depending upon the nature of the condensing agent. Thus when the condensing agent is a liquid; e.g., polyphosphoric acid, no solvent need be used whereas with a solid; e.g., aluminum chloride, a non-reactive solvent such as carbon disulfide, nitrobenzene, or s-tetrachloroethane is advantageously employed. The temperature at which the reaction is performed will vary depending upon the nature of the reactants and the condensing agents. Thus when employing aluminum chloride, room temperatures are usually effective for initiating the reaction whereas when with polyphosphoric acid a temperature in the range of 175° C. is generally desirable.

The product of the ring closure reaction is either a dibenzo[a,e]cycloheptatriene - 5 - one, or a dibenzo[a,d] [1,4] - cycloheptadiene - 5 - one, or a dibenzo[a,d][1,4] cycloheptadiene - 10 - one. The carbonyl function arising from the condensation may be utilized for conversion to various other groups. For example, a keto group in the 5-position can be employed for introduction of the 5-side chain present in the final compounds of my invention by treatment with a suitable alkylmagnesium halide. Alternatively a 5-keto dibenzo[a,d][1,4]cycloheptadiene (X) upon treatment with N-bromosuccimide followed by subsequent treatment with a tertiary amine yields the corresponding 5-keto dibenzo[a,e]cycloheptatriene (XII).

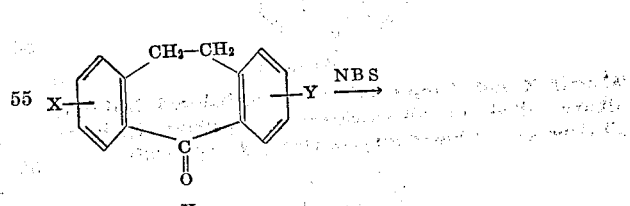

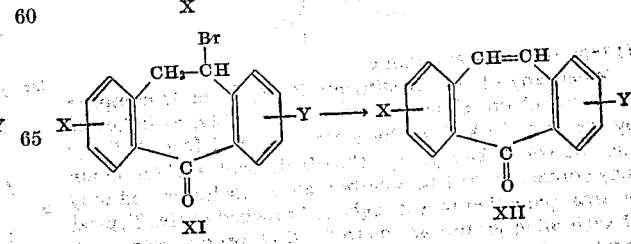

In an analogous fashion, when the product of the ring closure reaction possesses a keto group in the 10-position, advantage may be taken of same for introduction of an olefinic bond between C–10 and C–11 and/or an alkyl group at C-10. Thus a dibenzo[a,d][1,4]cycloheptadiene-10-one (XIII) is reduced by zinc and sodium hydroxide to the corresponding 10-hydroxy compound (XIV) which upon dehydration yields the dibenzo[a,e]-cycloheptatriene (XV).

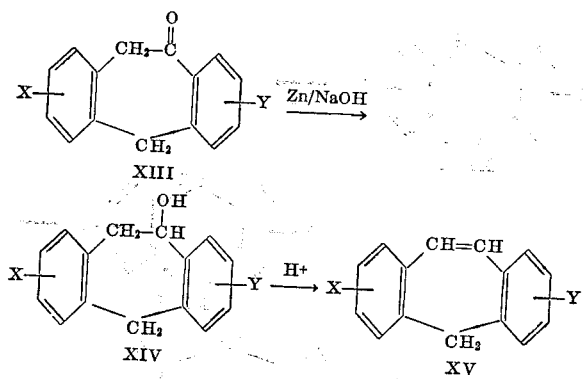

Alternatively by reacting a 10-keto compound with the appropriate Grignard reagent there is obtained the corresponding 10-alkyl-10-hydroxydibenzo[a,d][1,4]cycloheptadiene (XVI). This compound may be dehydrated as above to yield the corresponding unsaturation between C-10 and C-11.

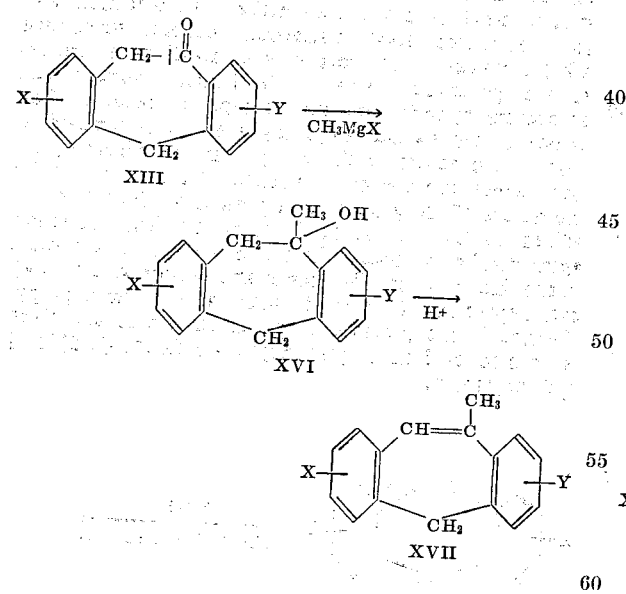

The olefinic bond between C-10 and C-11 in a dibenzo[a,e]cycloheptatriene is reduced by hydrogen and Raney nickel to yield the coresponding dibenzo[a,d][1,4]cycloheptadiene.

Alternatively a carbonyl function in the C-5 or C-10 position can be converted to a methylene group by reducing the keto compound to the corresponding hydroxyl with lithium aluminum hydride, chlorinating same with thionyl chloride, and replacing the chlorine atom with hydrogen by refluxing in zinc dust, potassium iodide, and acetic acid. Alternatively by treating a carbonyl compound with hydrazine, followed by decomposition of the hydrazone, a keto group is reduced to a methylene group as follows:

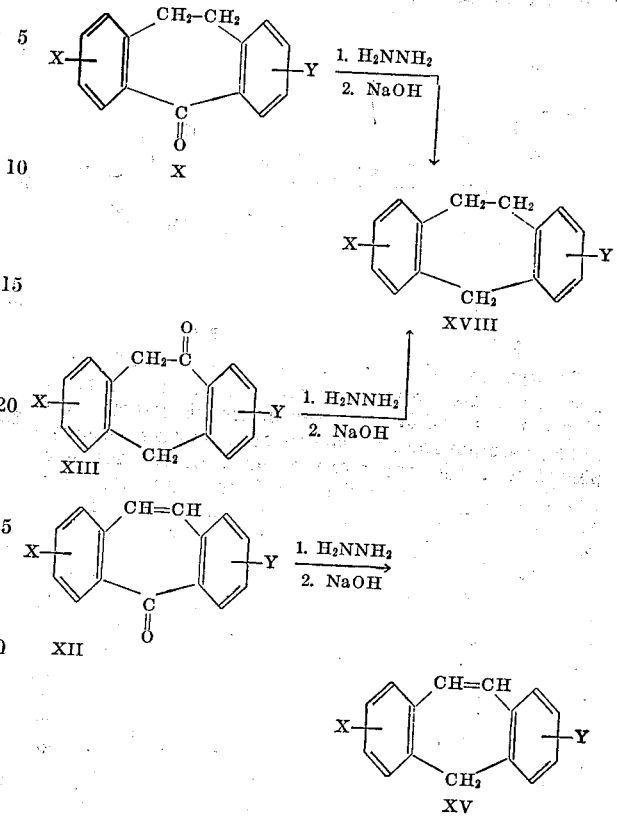

Compounds which are suitable for the ring closures described above may be prepared via several routes. For example, by decarboxylating an α-phenyl-o-bromocinnamic acid (XIX) to obtain a cis-2-styrylbromobenzene (XX) and treating the product with magnesium and carbon dioxide, there is prepared the corresponding cis-2-styrylbenzoic acid (XXI).

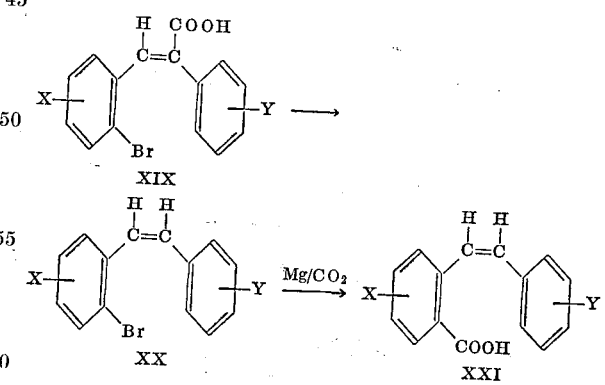

This compound (or its acid chloride) will then undergo ring closure as described above.

The trans form of the above 2-styrylbenzoic acid, prepared for example by the hydrolysis of benzalphthalide, will apparently not undergo ring closure; however catalytic reduction of the olefinic bond of trans-2-styrylbenzoic acid yields a 2-(2-phenylethyl)-benzoic acid which readily undergoes ring closure to yield dibenzo[a,d,][1,4]cycloheptadiene-5-one.

While benzalphthalide may serve as a starting material for the synthesis of the intermediate trans-2-styrylbenzoic acid, it and its substituted analogs are directly convertible to compounds which are suitable ring closure reactants. Employing hydriodic acid and phosphorus, a benzalphthalide (XXII) is converted to the corresponding 2-(2-phenyl-ethyl)-benzoic acid as follows:

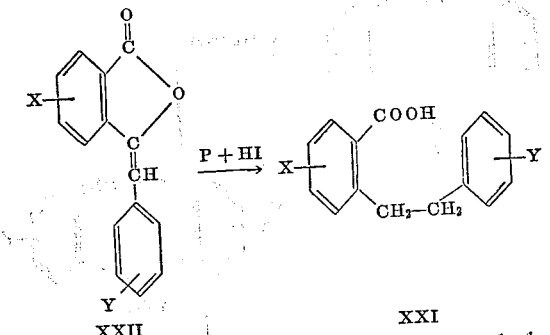

Preparation of these variously substituted benz-alphthalides may be accomplished by utilizing the reaction of phthalic anhydride or a substituted phenylacetic acid in fused sodium acetate. Thus for example when 4-methyl-phenylacetic acid and phthalic anhydride are heated at 230–250° for 4 hours there is formed p-methyl-benz-alphthalide. Treatment of this compound with hydriodic acid and phosphorus as previously described yields 2-[2-(4-methylphenyl)-ethyl]-benzoic acid.

As described above, ring closure with a 2-benzylphenyl-acetic acid can be effected. These intermediates may by the aforedescribed methods be prepared from the corresponding 2-benzyl benzoic acid (XXIII) by increasing the length of the alkanoic acid side chain from one carbon atom to two carbon atoms. For example the desired 2-benzylphenylacetic acid is obtained by employing the sequence shown below of (1) formation of the ester (XXIV), (2) reduction of the ester with lithium aluminum hydride to the alcohol (XXV), (3) conversion to the bromide (XXVI), (4) formation of the nitrile (XXVII), and (5) hydrolysis to the acid (XXVIII).

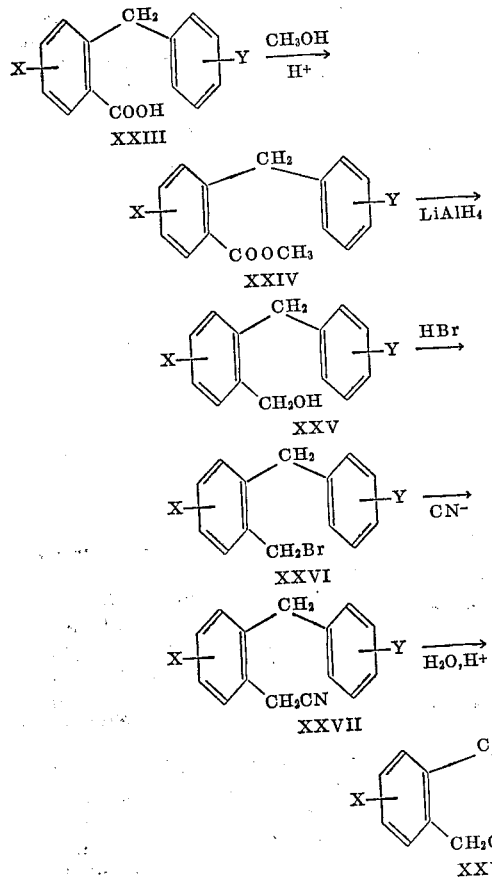

Alternatively a 2-benzylbenzoic acid may be converted to the corresponding 2-benzylphenylacetic acid by (1) treatment with methyl lithium to form a 2-benzylaceto-phenone (XXIX) and (2) subjecting this product to the action of sulfur in boiling morpholine.

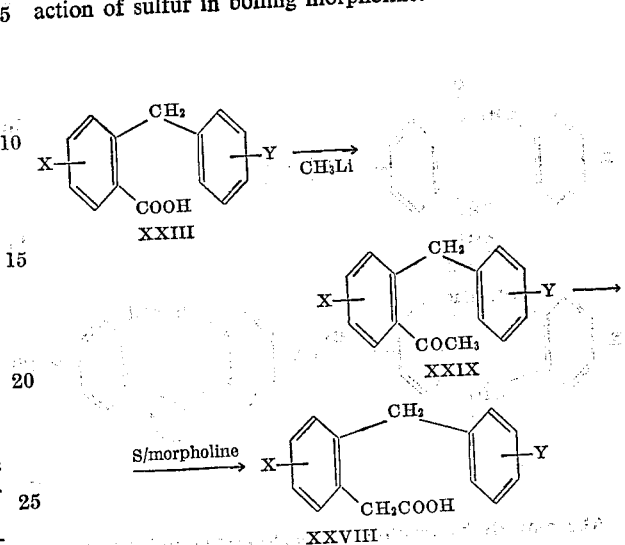

The final compounds of my invention having a structure according to Formula II are prepared by treating a dibenzocycloheptadiene or dibenzocycloheptatriene of Formula III with a member of a special class of alkylating agents. Such suitable alkylating agents include substituted alkyl halides in conjunction with potassium amide, substituted alkyl magnesium halides, substituted alkyl acrylates in conjunction with alkali metal amides such as potassium amide, or alkali metal hydrides such as sodium hydride, and similar types of reagents. The choice of the specific alkylating agent is determined in part by the nature of the group P in the dibenzocyclo-heptadienes and trienes of Formula III and in part by the nature of the groups to be present on the side chain affixed to C-5 in the final compound. The alkylating agent itself may contain the full side chain to be present in the final product. Thus for example dibenzo[a,d][1,4] cycloheptadiene is treated with dimethylaminopropyl chloride in the presence of potassium amide and there is formed 5-(3-dimethylaminopropyl)-dibenzo[a,d][1,4] cycloheptadiene.

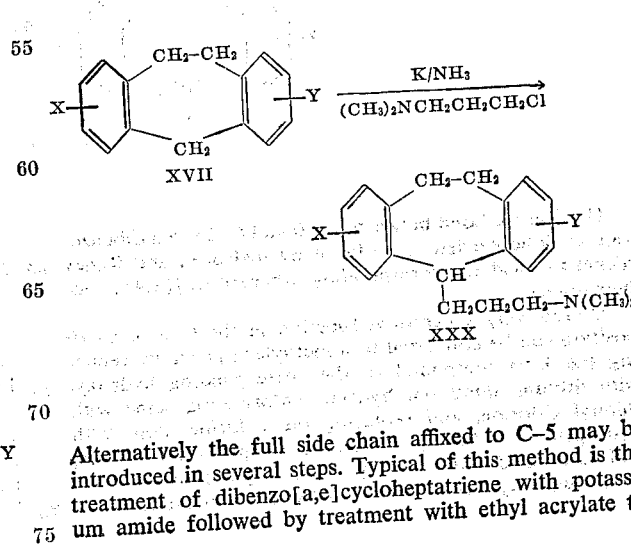

Alternatively the full side chain affixed to C-5 may be introduced in several steps. Typical of this method is the treatment of dibenzo[a,e]cycloheptatriene with potassium amide followed by treatment with ethyl acrylate to yield 5-(2-carbethoxyethyl)-dibenzo[a,e]cycloheptatriene (XXXI).

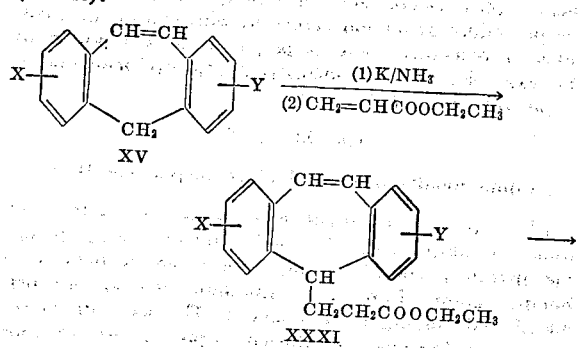

Subsequent treatment with piperidine then yields 5-(2-carboxypiperidinoethyl)-dibenzo[a,e]cycloheptatriene (XXXII) which when subjected to the action of lithium aluminum hydride is reduced to 5-(3-piperidinopropyl)-dibenzo[a,e]cycloheptatriene (XXXIII).

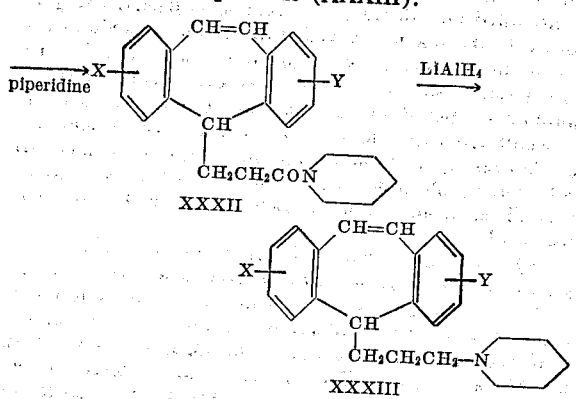

The entire side chain may also be represented in the alkylating agent but with modifications in the side chain being effected after alkylation. Thus a dibenzo[a,d][1,4]cycloheptadiene-5-one (X) is treated with 3-diethylaminopropylmagnesium bromide and there is formed the 5-(3-diethylaminopropyl)-dibenzo[a,d][1,4]cycloheptadiene-5-ol (XXXIV). Subsequent dehydration as with hydrochloric acid in glacial acid then yields the corresponding 5-(3-diethylaminopropylidene)-dibenzo[a,d][1,4]cycloheptadiene (XXXV).

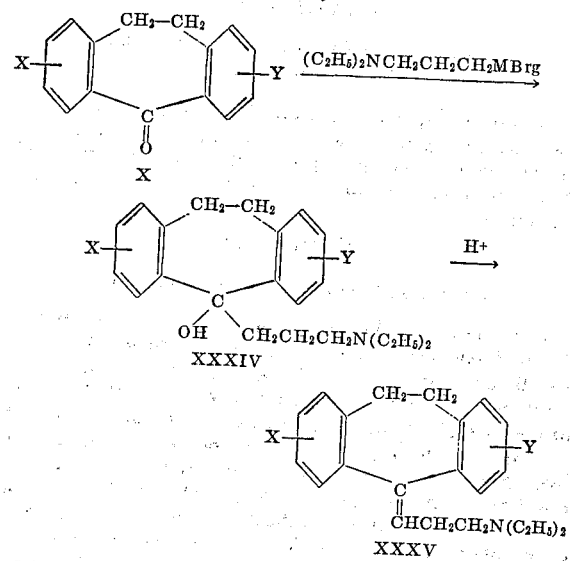

The general preparative routes which are applicable to my novel compounds are typified by the following examples. The following examples however are not to be construed as limiting the scope of this invention, the scope being limited only by the appended claims.

EXAMPLE 1

2-methoxydibenzo[a,d][1,4]cycloheptadiene-11-one (A) Methyl 2-(4-methoxybenzyl)-benzoate.—To a solution of 150 g. of 2-(4-methoxybenzyl)-benzoic acid in 2000 ml. of absolute methanol is added 150 ml. of concentrated sulfuric acid. The solution is then heated at reflux for 18 hours and at the end of this time, the excess methanol is removed by distillation in vacuo. The residual liquid is poured into 2000 ml. of water and the mixture rendered alkaline by addition of aqueous sodium hydroxide. The basic mixture is then extracted three times with 100 ml. portions of ether and the ethereal extracts dried over magnesium sulfate. The drying agent is then removed by filtration and the ether removed by distillation. Distillation of the residue in vacuo then yields the product, methyl 2-(4-methoxybenzyl)-benzoate, B.P. 160–165°/2 mm.

(B) 2-(4-methoxybenzyl)-benzyl alcohol.—A solution of 200 g. of methyl 2-(4-methoxybenzyl)-benzoate in 200 ml. of anhydrous ether is added in a dropwise fashion to a solution of 76 g. of lithium aluminum hydride in 2000 ml. of anhydrous ether so as to maintain a moderate reaction rate. At the end of the addition period the reaction mixture is heated at reflux for 15 hours and then cooled. There is then cautiously added 50 g. of ethyl acetate followed by 100 ml. of water. The organic layer is then separated and washed with 100 ml. of water. The ethereal solution is dried over magnesium sulfate and the dried solution reduced to a residue in vacuo. Distillation of the residue in vacuo then yields the product 2-(4-methoxybenzyl)-benzyl alcohol B.P. 180–185°/3 mm.

(C) 2-(4-methoxybenzyl)-benzyl bromide.—A mixture of 167 g. of 2-(4-methoxybenzyl)-benzyl alcohol and 500 ml. of a 48% aqueous hydrogen bromide solution is heated at reflux temperature for 3 hrs. The solution is cooled and poured into ice water. The mixture is then extracted with three 100 ml. portions of ether. The ethereal solution is dried over magnesium sulfate and evaporated to a residue in vacuo. Crystallization of the crude product from hexane then yields 2-(4-methoxybenzyl)-benzyl bromide.

(D) 2-(4-methoxybenzyl)-phenylacetic acid.—There are combined 28 g. of potassium cyanide, 149 g. of 2-(4-methoxybenzyl)-benzyl bromide and 500 ml. of 95% ethanol. The mixture is heated at reflux for 3 hours. At the end of this period the mixture is poured into 300 ml. of water and extracted with three 150 ml. portions of ether. The combined ethereal extracts are dried and reduced to a residue in vacuo. To the crude mixture is then added 100 ml. of water, 100 ml. of concentrated $H_2SO_4$ and 200 ml. of acetic acid. The mixture is then refluxed for 3 hours and at the end of this time cooled and poured into water. Upon standing overnight crystals form which, when collected by filtration and recrystallized from ethanol, yield the product, 2-(4-methoxybenzyl)-phenylacetic acid.

(E) 2-methoxydibenzo[a,d][1,4]cycloheptadiene-11-one.—A mixture of 500 g. of polyphosphoric acid and 50 g. of 2-(4-methoxybenzyl)-phenylacetic acid are heated at 175–180° C. for a period of 4 hours. The cooled reaction mixture is then poured into water and extracted with three 150 ml. portions of ether. The ethereal extracts are then washed once with water and once with dilute aqueous sodium bicarbonate solution. After drying the ethereal solution over magnesium sulfate, the ether is removed in vacuo. Recrystallization of the residue from hexane then yields the product of this example, 2-methoxydibenzo[a,d][1,4]cycloheptadiene-11-one.

EXAMPLE 2

2-methyldibenzo[a,d][1,4]cycloheptadiene-11-one

One hundred and fifty grams of 2-(4-methylbenzyl)-benzoic acid are esterified according to the procedure of Example 1A and the product then subjected to the reaction sequence as described in Example 1B through 1E, using the equivalent amounts of reactants therein described. There is thus prepared 2-methyl-dibenzo[a,d][1,4]cycloheptadiene-11-one.

EXAMPLE 3

2-chlorodibenzo[a,d][1,4]cycloheptadiene-11-one

By subjecting 2-(4-chlorobenzyl)-benzoic acid to the reaction sequence as described in Example 1 there is prepared the compound of this example 2-chlorodibenzo-[a,d][1,4]cycloheptadiene-11-one.

EXAMPLE 4

Dibenzo[a,d][1,4]cycloheptadiene-11-one 2-benzylbenzoic acid is reacted according to the procedures of Example 1 and there is thus prepared dibenzo-[a,d][1,4]-cycloheptadiene-11-one, M.P. 73–75° C.

EXAMPLE 5

3-chlorodibenzo[a,d][1,4]cycloheptadiene-5-one (A) p-Chlorobenzalphthalide.—A mixture of 50 g. of phthalic anhydride, 68 g. of p-chlorophenylacetic acid and 1.5 g. of freshly fused sodium acetate is heated at 235–240° for a period of 4 hours. The mixture is then allowed to cool to room temperature whereupon it solidifies. The crude mixture is recrystallized from ethanol yielding p-chlorobenzalphthalide, M.P. 151–153°.

(B) 2-[2-(4-chlorophenyl)-ethyl]benzoic acid. — A mixture of 42 g. of p-chlorobenzalphthalide, 190 ml. of hydriodic acid (specific gravity 1.7) and 14 g. of red phosphorus is heated at reflux temperature for 6 hours. The mixture is then cooled and an additional 9 g. of phosphorus are introduced. The mixture is refluxed for another 6 hour period and at the end of this time poured into ice water. The mixture is then filtered and the solid so collected is added to 400 ml. of concentrated ammonium hydroxide solution. The solution is boiled for 20 minutes, cooled and filtered. The filtrate is next rendered acidic by the addition of hydrochloric acid. The solid material is collected by filtration and is recrystalized from ethanol, yielding 2-[2-(4-chlorophenyl)-ethyl]-benzoic acid, M.P. 129–131°.

(C) 3 - chlorodibenzo[a,d][1,4]cycloheptadiene - 5-one. — To 50 g. of 2-[2-(4-chlorophenyl)-ethyl]-benzoic acid is added 360 g. of polyphosphoric acid and the mixture heated for 3 hours at 170–175° C. At the end of this time the mixture is cooled and poured into 400 ml. of ice and water. The aqueous mixture is then extracted with ether and the ethereal solution so obtained washed with water, aqueous sodium bicarbonate, and finally again with water. The organic solution is then dried over magnesium sulfate, filtered and concentrated in vacuo. Distillation of the residue in vacuo yields the compound of this example, 3-chlorodibenzo[a,d][1,4]cycloheptadiene-5-one, B.P. 180–185°/1 mm.

EXAMPLE 6

3-methoxydibenzo[a,d][1,4]cycloheptadiene-5-one

Sixty-six grams of p-methoxyphenylacetic acid are heated with phthalic anhydride and sodium acetate in the manner of Example 5A. There is thus obtained upon purification as therein described, p-methoxybenzalphthalide, 57 g. of which are then reacted with 240 ml. of hydriodic acid and a total of 30 g. of red phosphorus according to the procedure of Example 5B. The product, 2-[2-(4-methoxyphenyl)-ethyl]benzoic acid is next subjected to the action of polyphosphoric acid as described in Example 5C and upon purification as therein described, there is obtained the compound of this example, 3 - methoxydibenzo[a,d][1,4]cycloheptadiene-5-one, B.P. 167–173°/0.5 mm.

EXAMPLE 7

3-methyldibenzo[a,d][1,4]cycloheptadiene-5-one

By substituting 60 g. of p-methylphenylacetic acid for p-chlorophenylacetic acid in Example 5 and following the procedure as therein described with equivalent quantities of reactants, there is prepared the compound of this example, 3-methyldibenzo[a,d][1,4]cycloheptadiene-5-one, B.P. 165–173°/1 mm.

EXAMPLE 8

2,8-dimethyldibenzo[a,d][1,4]cycloheptadiene-10-one (A) 2-p-toluyl-4-methylbenzoic acid.—To 400 g. of toluene is added 110 g. of 4-methylphthalic anhydride and the mixture is cooled by immersion in an ice bath. Two hundred grams of anhydrous aluminum chloride are then added and stirring is commenced. The ice bath is removed and the reaction allowed to proceed for 15 minutes. At the end of this time the mixture is heated at 90° for 2½ hours while stirring is continued. The mixture is then chilled and sufficient ice is added to the reaction mixture to decompose the solids, followed by 150 ml. of concentrated hydrochloric acid. The aqueous layer is decanted and filtered, the solid so collected being returned to the reaction vessel. Fifty grams of sodium carbonate in one liter of water are next added and the mixture steam distilled to remove excess toluene. The hot solution is filtered and acidified by addition of 65 cc. of concentrated hydrochloric acid. The oil which separates crystallizes upon cooling and the solids so formed are collected by filtration, washed with water, dried, and recrystallized from hexane to yield 2-p-toluyl-4-methylbenzoic acid.

(B) 2-(4-methylbenzyl)-4-methylbenzoic acid.—Fifty grams of 2-p-toluyl-4-methylbenzoic acid are dissolved in 150 ml. of glacial acetic acid and to the solution is added 5 g. of 10% palladium on carbon. The mixture is placed on a Parr hydrogenation apparatus and shaken at 60° for five hours. The mixture is then filtered, cooled and poured into 400 ml. of water. The solid which forms is collected by filtration and dried, yielding 2-(4-methylbenzyl)-4-methylbenzoic acid.

(C) 2,8 - dimethyldibenzo[a,d][1,4]cycloheptadiene-10-one.—The compound prepared in Part B of this example, 2-(4-methylbenzyl)-4-methylbenzoic acid is subjected to the reaction sequences as described in Example 1. There is thus prepared upon purification in the prescribed method the compound of this example, 2,8-dimethyldibenzo[a,d][1,4]cycloheptadiene-10-one.

EXAMPLE 9

2-methyl-8-butyldibenzo[a,d][1,4]cyclo-heptadiene-10-one

By substituting butyl benzene for toluene in Example 8 and subjecting it to the reaction sequences therein described, there is obtained upon purification the compound of this example, 2-methyl-8-butyldibenzo[a,d][1,4]cycloheptadiene-10-one.

EXAMPLE 10

2-methoxydibenzo[a,e]cycloheptatriene

Thirty grams of the compound prepared in Example 1, 2 - methoxydibenzo[a,d][1,4]cycloheptadiene - 11 - one, are dissolved in 200 ml. of absolute ethanol and to the solution is added 30 g. of Raney nickel catalyst. The mixture is then placed on a Parr hydrogenation apparatus and treated with hydrogen until the theoretical amount of hydrogen is consumed. The mixture is then filtered and the filtrate concentrated in vacuo. The residue is then treated without further purification with 15 ml. of 85% o-phosphoric acid at 160° for 2 hours. The reaction mixture is cooled, poured into water, and extracted with ether. The ethereal extracts are then washed with dilute sodium bicarbonate and with water, dried, and evaporated to a residue. The crude product is recrystallized from methanol to yield 2-methoxydibenzo[a,e]-cycloheptatriene.

In a similar fashion by subjecting 2-methyldibenzo-[a,d][1,4]cycloheptadiene - 11 - one, dibenzo[a,d][1,4]-cycloheptadiene - 11 - one, 2,8-dimethyldibenzo[a,d]-[1,4]cycloheptadiene - 10 - one and 2-methyl-8-butyldi-benzo[a,d][1,4]cycloheptadiene-10-one to the reduction procedure described in this example, there are prepared respectively 2 - methyldibenzo[a,e]cycloheptatriene, di-benzo[a,e]-cycloheptatriene, 2,8 - dimethyldibenzo[a,e]-cycloheptatriene, and 2 - methyl - 8 - butyldibenzo[a,e]-cycloheptatriene.

EXAMPLE 11

2-chlorodibenzo[a,e]cycloheptatriene

A solution of 23 g. of 2-chlorodibenzo[a,d][1,4] cyclo-heptadiene-11-one in 30 ml. of anhydrous ether is added dropwise to 7.6 g. of lithium aluminum hydride in 200 ml. of anhydrous ether according to the procedure of Example 1B. Upon completion of the reflux period of 15 hours the mixture is treated with 5 g. of ethyl acetate and 10 ml. of water and extracted with ether as therein described. The dried ethereal solution is reduced to a residue and the residue treated with 15 ml. of o-phosphoric acid for 2 hours at 160° in the manner described in Example 10. Upon purification as therein described, there is obtained 2-chlorodibenzo[a,e]cycloheptatriene.

EXAMPLE 12

3-methoxydibenzo[a,e]cycloheptatriene-5-one

To 155 g. of 3-methoxydibenzo[a,d][1,4]cyclohepta-diene-5-one in 1300 ml. of anhydrous carbon tetrachloride is added 117 g. of N-bromosuccinimide and 1.0 g. of benzoyl peroxide. The mixture is stirred at reflux temperature for 1½ hours. The reaction mixture is then filtered and the filtrate washed with 5% sodium hydroxide followed by water. Concentration of the washed filtrate in vacuo yields the crude monobromide material which is treated without further purification with 1 l. of triethyl-amino. The triethylamino solution is refluxed for 2 hours and then concentrated to a residue in vacuo. To the residue is added an excess of 10% hydrochloric acid and the solid material collected by filtration. Recrystallization of the solid from ethanol yields 3-methoxydibenzo[a,e]cy-cloheptatriene-5-one.

In a similar manner by subjecting equivalent amounts of 3 - methyldibenzo[a,d][1,4]cycloheptadiene - 5 - one, 3 - chlorodibenzo[a,d][1,4]cycloheptadiene - 5 - one and dibenzo[a,d][1,4]cycloheptadiene - 5 - one to the procedure described in this example, there are prepared 3-methyldibenzo[a,e]cycloheptatriene-5-one, 3 - chlorodi-benzo[a,e]cycloheptatriene-5-one and dibenzo[a,e]cyclo-heptatriene-5-one.

EXAMPLE 13

3-methoxydibenzo[a,e]cycloheptatriene

A mixture of 46.5 g. of 3-methoxydibenzo[a,e]cyclo-heptatriene-5-one, 30 g. of potassium hydroxide, 800 ml. of trimethylene glycol, 150 ml. of hydrazine hydrate and 50 ml. of isopropanol is stirred at reflux temperature for 3½ hours. At the end of this time the reaction apparatus is arranged for distillation, the temperature raised to 200° C., and the reaction mixture heated at this temperature for an additional 4 hours. The reaction mixture is next cooled, poured into ice water, neutralized by the cautious addition of hydrochloric acid, and extracted with ether. The ethereal extracts are washed with water, dried over magnesium sulfate, and concentrated to a residue in vacuo which when crystallized from methanol yields 3-methoxy-dibenzo[a,e]-cycloheptatriene.

In a similar fashion by subjecting 3-chlorodibenzo-[a,e]cycloheptatriene-5-one, 3 - chlorodibenzo[a,d][1,4]-cycloheptadiene-5-one, 3 - methyldibenzo[a,e]cyclohepta-triene-5-one, 3 - methyldibenzo[a,d][1,4]cycloheptadiene-5-one, dibenzo[a,e]cycloheptatriene-5-one, dibenzo [a,d]-[1,4]cycloheptadiene-5-one, and 3 - methoxydibenzo[a,d]-[1,4]cycloheptadiene-5-one to the reaction procedure described in the instant example, there are prepared the following compounds respectively: 3-chlorodibenzo[a,e]cy-cloheptatriene, 3-chlorodibenzo[a,d][1,4]cycloheptadi-ene, 3 - methyldibenzo[a,e]cycloheptatriene, 3 - methyl-dibenzo[a,d][1,4]cycloheptadiene, dibenzo [a,e]cyclohep-tatriene, dibenzo[a,d][1,4]cycloheptadiene, and 3-meth-oxydibenzo[a,d][1,4]cycloheptadiene.

EXAMPLE 14

2,11-dimethyldibenzo[a,e]cycloheptatriene

To a solution of 33.4 g. of methyl magnesium iodide in 100 ml. of anhydrous ether is added 22.2 g. of 2-methyl-dibenzo[a,d][1,4]cycloheptadiene - 11 - one in 50 ml. of anhydrous ether. The reaction mixture is refluxed for 6 hours and then cooled. One hundred and fifty grams of 10% sulfuric acid are then cautiously added and the mixture extracted with chloroform. The chloroform solution is dried and the chloroform removed in vacuo. The crude residue thus obtained, consisting essentially of 2,11-di-methyldibenzo[a,d][1,4]cycloheptadiene - 11 - ol, is then treated with polyphosphoric acid in the manner described in Example 10. There is thus prepared, 2,11-dimethyldi-benzo[a,e]cycloheptatriene.

EXAMPLE 15

2-chloro-11-ethyldibenzo[a,e]cycloheptatriene

A solution of 24.2 g. of 2-chlorodibenzo[a,d][1,4] cycloheptadiene-11-one in 50 ml. of anhydrous ether is treated with an ethereal solution of 36.2 g. of ethyl-magnesium bromide in the manner of Example 14. Upon treatment of the crude intermediate 2-chloro-11-ethyl-dibenzo[a,d][1,4]cycloheptadiene-11-ol as therein described with phosphoric acid there is obtained the compound of this example, 2-chloro-11-ethyldibenzo[a,e] cycloheptatriene.

EXAMPLE 16

5-(3-dimethylaminopropyl)dibenzo[a,e]cycloheptatriene

To a solution of 2.1 g. potassium in 400 ml. of anhydrous liquid ammonia and 100 mg. ferric oxide is added dropwise with vigorous stirring a solution of 9.6 g. of dibenzo[a,e]cycloheptatriene in 100 ml. of anhydrous ether. Upon completion of the addition, the ammonia is allowed to evaporate and the resulting ether solution is warmed on the steam bath for 2 hours. A solution of 6.1 g. of dimethylaminopropyl chloride in 100 ml. of anhydrous ether is added dropwise with stirring and the mixture refluxed with stirring overnight. The mixture upon cooling is decomposed by the cautious addition of 100 ml. of ice water. The layers are separated and the aqueous layer extracted with ether. The combined ether solutions are next extracted with 10% hydrochloric acid and the acidic solution then rendered basic by addition of ammonium hydroxide. The precipitated oil is extracted three times with chloroform and the chloroform extracts dried, concentrated in vacuo, and the residue distilled to yield 5 - (3 - dimethylaminopropyl)dibenzo[a,e]cycloheptatri-ene, B.P. 196–198°/4 mm.

Upon treatment of an ethereal solution of the product with anhydrous hydrogen chloride there is formed 5-(3-di-methylaminopropyl)-dibenzo[a,e]cycloheptatriene hydrochloride, M.P. 191–192°.

In a similar fashion, by substituting the appropriate aminoalkyl chloride for dimethylaminopropyl chloride in the procedure of this example, there are prepared 5-(2-di-methylaminoethyl) - dibenzo[a,e]cycloheptatriene, B.P. 185–190°/2 mm. and 5-(2-dimethylaminopropyl)-dibenzo [a,e]cycloheptatriene, B.P. 187–190°/0.5 mm.

By subjecting other dibenzo[a,e]cycloheptatrienes or the appropriate dibenzo[a,d][1,4]cycloheptadienes for dibenzo[a,e]cycloheptatriene in the procedure of this example and employing the appropriate aminoalkyl chloride, the following compounds are prepared: 5-(3-dimethyl-aminopropyl) - dibenzo[a,d][1,4]cycloheptadiene, B.P.

178–179°/1 mm.; 5-(2-methyl-3-dimethylaminopropyl)-dibenzo[a,d][1,4]cycloheptadiene, B.P. 180–185°/1 mm.; 5-(3-dimethylaminopropyl)-10-methyldibenzo[a,d][1,4]cycloheptadiene, B.P. 185–188°/0.05 mm.; 3-chloro-5-(3-dimethylaminopropyl)dibenzo[a,e]cycloheptatriene, B.P. 215–218°/0.05 mm.; 2,11-dimethyl-[5-(3-dimethylaminopropyl)]-dibenzo[a,e]cycloheptatriene; 3-chloro-5-(3-dimethylaminopropyl)-dibenzo[a,d][1,4]cycloheptadiene, B.P. 208–210°/0.05 mm.; 3-methoxy-5-(3-dimethylaminopropyl)-dibenzo[a,e]cycloheptatriene, B.P. 227–230°/0.05; and 2-chloro-5-(3-dimethylaminopropyl)-dibenzo[a,e]cycloheptatriene.

EXAMPLE 17

5-[3-(N-methylpiperazino)-propyl]-dibenzo[a,e]cycloheptatriene

A solution of 9.6 g. of dibenzo[a,e]cycloheptatriene in 100 ml. of anhydrous ether is treated with potassium metal, liquid ammonia, and ferric oxide in the manner of Example 16. The mixture is then reacted with 11.3 g. of 3-(N-methylpiperazino)-propyl chloride as therein described. Upon purification in the prescribed manner there is obtained the compound of this example 5-[3-(N-methylpiperazino)-propyl]-dibenzo[a,e]cycloheptatriene, B.P. 200–203°/0.1 mm.

In a similar fashion there are prepared by using the appropriate cycloaminoalkyl chlorides and the appropriate dibenzo[a,e]cycloheptatrienes or dibenzo[a,e][1,4]cycloheptadienes the following compounds: 5-(3-morpholinopropyl)-dibenzo[a,e]cycloheptatriene, B.P. 199–203°/1 mm.; 5-[3-(N-methylhexahydro-pyrimidino)-propyl]-dibenzo[a,e]cycloheptatriene; 5-(3-pyrrolidinopropyl)-dibenzo[a,e]cycloheptatriene; 5-(3-N-methylhomopiperazinopropyl-dibenzo[a,e]cycloheptatriene, B.P. 200–210°/1 mm.; 5-(3-pyrrolidinopropyl)-dibenzo[a,d][1,4]cycloheptadiene, B.P. 165–168°/0.05 mm.; 3-methyl-5-[3-(N-methylpiperazino)-propyl]-dibenzo[a,d][1,4]-cycloheptadiene; 2-methyl-5-(3-pyrrolidinopropyl)-8-butyldibenzo[a,e]cycloheptatriene; and 2-chloro-5-[3-(N-methylpiperazino)-propyl]-11-ethyldibenzo[a,e]cycloheptatriene.

EXAMPLE 18

5[3-(N-[2-hydroxyethyl]-piperazino)-propyl]-dibenzo-[a,e]-cycloheptatriene (A) 5-[3-(1,2-dihydropyranyl-4-oxy)-propyl]-dibenzo[a,e]cycloheptatriene.—A solution of 19.2 g. of dibenzo[a,e]cycloheptatriene in 200 ml. of ether is treated with liquid ammonia, potassium, and ferric oxide as described in Example 16, employing however twice the quantities of reactants therein described. There is then added in the manner therein set forth 17.6 g. of 4-(3-chloropropyloxy)-1,2-dihydropyran. The procedure described in Example 16 is then followed through the decomposition of the reaction mixture and the ether extraction, omitting the acid extraction. The crude semi-crystalline product obtained upon concentration of the ethereal solution is employed in the next part of this example without further purification.

(B) 5-[3-(N-[2-hydroxyethyl]-piperazino)-propyl]-dibenzo[a,e]cycloheptatriene.—Sixteen grams of 5-[3-(1,2-dihydropyranyl-4-oxy)-propyl]-dibenzo[a,e]cycloheptatriene are added to 50 ml. of 48% hydrobromic acid and the mixture heated on a steam bath for 2 hours. The solution is concentrated in vacuo and the residue added to water. The mixture is extracted with chloroform and the chloroform extracts evaporated to a residue. There is then added to the residue, 30 g. of N-(2-hydroxyethyl)-piperazine and the mixture heated for 8 hours on a steam bath. Water is then added to the reaction mixture and the aqueous mixture extracted with chloroform. The chloroform extracts are dried and concentrated by evaporation and the residue distilled in vacuo to yield 5-[3-(N-[2-hydroxyethyl]-piperazino)-propyl]-dibenzo[a,e]cycloheptatriene, 210–220°/0.05 mm.

EXAMPLE 19

5-(3-piperidinopropyl)-dibenzo[a,e]cycloheptatriene (A) 5-(2-carbethoxyethyl)-dibenzo[a,e]cycloheptatriene.—A solution of 28.8 g. of dibenzo[a,e]cycloheptatriene in anhydrous ether is reacted with corresponding amounts of potassium, liquid ammonia and ferric oxide in the manner of Example 16. There is then added 13.9 g. of ethyl acrylate and the reaction executed as therein described. Upon purification in the prescribed manner, there is obtained 5-(2-carbethoxyethyl)-dibenzo[a,e]cycloheptatriene, B.P. 185–190°/1 mm.

(B) 5-(2-piperidinocarboxyethyl)-dibenzo[a,e]cycloheptatriene.—Ten grams of 5-(2-carbethoxyethyl)-dibenzo[a,e]cycloheptatriene are added to 30 g. of piperidine and the mixture allowed to stand at room temperature for 15 hours. The product is isolated by pouring the reaction mixture into water, filtering, and recrystallizing the solid so obtained from ethanol to yield 5-(2-piperidinocarboxyethyl)-dibenzo[a,e]cycloheptatriene.

(C) 5-(3-piperidinopropyl)-dibenzo[a,e]cycloheptatriene.—Six grams of 5-(2-piperidinocarboxyethyl)-dibenzo[a,e]cycloheptatriene are added to 100 ml. of anhydrous ether and 50 ml. of anhydrous benzene and the solution added dropwise with stirring to 1 g. of lithium aluminum hydride in 100 ml. of ether. The stirring is continued while the mixture is heated at reflux for 12 hours and the mixture is then decomposed by the addition of ice water. Extraction with ether followed by drying and evaporation of the ethereal extracts yield the product 5-(3-piperidinopropyl)-dibenzo[a,e]cycloheptatriene, B.P. 197–203°/0.2 mm.

In a similar fashion by substituting dibenzo[a,d][1,4]cycloheptadiene for dibenzo[a,e]cycloheptatriene in the above reaction procedure, there is prepared the corresponding compound 5-(3-piperidinopropyl)-dibenzo[a,d][1,4]cycloheptadiene, B.P. 190–191°/0.1 mm.

EXAMPLE 20

5-[3-(N-[3-dimethylaminopropyl]-amino)-propyl]-dibenzo[a,e]cycloheptatriene (A) 5-[N-(3-dimethylaminopropyl)-propionamide]-dibenzo[a,e]cycloheptatriene.—A mixture of 16 g. of 5-(2-carbethoxyethyl)-dibenzo-[a,e]cycloheptatriene (prepared as in Example 19A) in 250 ml. of dry hexane, 1 g. of anhydrous sodium methylate and 20.8 g. of 3-dimethylaminopropylamine is heated on a steam bath with provisions made for the removal of ethanol. When the formation of ethanol ceases, the mixture is subjected to fractional distillation, the product 5-[N-(3-dimethylaminopropyl)-propionamide]-dibenzo[a,e]-cycloheptatriene being collected at 170–175°/1 mm.

(B) 5-[3-(N-[dimethylaminopropyl]-amino)-propyl]-dibenzo[a,e]cycloheptatriene.—The compound prepared in Part A of this example is subjected to the lithium aluminum hydride reduction as described in Example 19C. There is thus prepared upon purification as therein described the compound of this example, 5-[3-(N-[dimethylaminopropyl]-amino)-propyl]-dibenzo-[a,e]cycloheptatriene.

EXAMPLE 21

5-[3-(N-[2-hydroxyethyl]-piperazino)-propyl]-dibenzo-[a,d][1,4]cycloheptadiene

Ten grams of 5-[3-(N-[2-hydroxyethyl]-piperazino)-propyl]-dibenzo[a,e]cycloheptatriene in 100 ml. of absolute ethanol are subjected to the action of hydrogen gas in the presence of Raney nickel catalyst in a Parr hydrogenation apparatus. Upon removal of the catalyst by filtration and evaporation of the solvent, there is obtained the crude product which is distilled in vacuo to yield 5-[3-(N-[2-hydroxyethyl]-piperazino)-propyl]-dibenzo[a,d][1,4]cycloheptadiene.

EXAMPLE 22

5-(3-dimethylaminopropyl)-dibenzo[a,d][1,4]cycloheptadiene-5-ol

To a suspension of 7.2 g. magnesium metal in 100 ml. of ether is added a solution of 36.4 g. of dimethylaminopropyl chloride and 2 ml. of ethyl bromide in 50 ml. of ether. The mixture is stirred vigorously while 21 g. of dibenzo[a,d][1,4]cycloheptadiene-5-one in 200 ml. of ether are added over a 20 minute period. The mixture is stirred at reflux for 6 hours and then poured into a dilute ammonium chloride solution and extracted with chloroform. After removing the chloroform in vacuo, the residue is triturated with petroleum ether. Recrystallization of the solid from hexane yields 5-(3-dimethylaminopropyl)-dibenzo[a,d][1,4]cycloheptadiene-5-ol, M.P. 116–118°.

Treatment of an ethereal solution of this product with anhydrous hydrogen chloride forms 5-(3-dimethylaminopropyl) - dibenzo[a,d][1,4]cycloheptadiene-5-ol hydrochloride, M.P. 217–218°.

In a similar fashion by substituting dibenzo[a,e]-cycloheptatriene-5-one and 3-chloro-dibenzo[a,d][1,4]cycloheptadiene-5-one in the above example there are prepared respectively 5-(3-dimethylaminopropyl)-dibenzo[a,e]cycloheptatriene-5-ol, M.P. 136–137° and 3-chloro-5-(3-dimethylaminopropyl)-dibenzo[a,d][1,4]cycloheptadiene-5-ol.

Example 23

5-(3-dimethylaminopropylidene)-dibenzo[a,d][1,4]cycloheptadiene

A mixture of 13 g. of 5-(3-dimethylaminopropyl)-dibenzo[a,d][1,4]cycloheptadiene-5-ol, 40 ml. of hydrochloric acid, and 135 ml. of glacial acetic acid is refluxed for 3½ hours. The solution is then evaporated to dryness in vacuo and added to ice water which is then rendered basic by addition of ammonium hydroxide solution. Extraction of the basic solution with chloroform and removal of the solvent from the dried chloroform extracts yields the crude product which when distilled in vacuo yields essentially pure 5-(3-dimethylaminopropylidene)-dibenzo[a.d][1,4]cycloheptadiene, B.P. 164–166°/1 mm.

Upon treatment of an ethereal solution of this compound with anhydrous hydrogen chloride, there is formed 5-(3-dimethylaminopropylidene)-dibenzo[a,d][1,4]cycloheptadiene hydrochloride, M.P. 194–195°.

In a similar fashion, 5-(3-dimethylpropyl)-dibenzo[a,e]cycloheptatriene-5-ol and 3-chloro-5-(3-dimethylaminopropyl)-dibenzo[a,d][1,4]cycloheptadiene-5-ol are dehydrated by the above procedure to yield 5-(3-dimethylaminopropylidene) - dibenzo[a,e]cycloheptatriene, B.P. 173–177°/1 mm. and 3-chloro-5-(3-dimethylaminopropylidene)-dibenzo[a,d][1,4]cycloheptadiene, B.P. 190–193°/0.5 mm.

EXAMPLE 24

5-(3-dimethylaminopropyl)-dibenzo[a,e]cycloheptatriene-3-ol

Twenty grams of 3-methoxyl-5-(3-dimethylaminopropyl)-dibenzo[a,e]cycloheptatriene, prepared as in Example 16, are heated with 40 ml. of 47% hydrobromic acid and 150 ml. of glacial acetic acid for a period of eight hours. The reaction mixture is then concentrated in vacuo and the residue rendered basic by addition of dilute aqueous sodium bicarbonate solution. The solid is next collected by filtration and recrystallized from a benzene-hexane solution to yield the compound of this example 5-(3-dimethylaminopropyl)-dibenzo[a,e]cycloheptatriene-3-ol.

EXAMPLE 25

3-acetoxy-5-(3-dimethylaminopropyl)-dibenzo[a,e]cycloheptatriene

Five grams of 5-(3-dimethylaminopropyl)-dibenzo[a,e]-cycloheptatriene-3-ol is heated with 10 g. of acetic anhydride for fifteen minutes at steam bath temperature. The mixture is then cooled and poured into water and the solution rendered alkaline by addition of dilute sodium hydroxide. The solid is then collected by filtration, dried and recrystallized from benzene yielding 3-acetoxy-5-(3-dimethylamiopropyl)-dibenzo[a,e]cycloheptatriene.

In a similar fashion by substituting other lower alkanoic acid anhydrides in the above procedure, the corresponding esters are formed. Thus there is prepared by use of propionic anhydride, 3-propionoxy-5-(3-dimethylaminopropyl)-dibenzo[a,e]cycloheytatriene.

EXAMPLE 26

5-(2-methyl-3-dimethylaminopropyl)-dibenzo[a,e]cycloheptatriene

A solution of 19.2 g. of dibenzo[a,e]cycloheptatriene in 50 ml. of anhydrous xylene is added in a dropwise fashion with stirring to a suspension of 2.6 g. of sodium hydride in 500 ml. of refluxing anhydrous xylene. The mixture is heated at reflux for two hours with continual agitation and there is then added dropwise a solution of 13.5 g. of 2-methyl-3-dimethylaminopropyl chloride in an equal volume of xylene. The mixture is then heated for fifteen hours, after which time it is cooled and decomposed by the cautious addition of 100 ml. of ice water. The layers are separated and the aqueous layer extracted with ether. The combined organic layers are next extracted with 10% hydrochloric acid and the acidic extracts then rendered alkaline by the addition of ammonium hydroxide. The precipitated oil is extracted three times with chloroform. The chloroform extracts are dried and concentrated in vacuo, the residue being distilled to yield 5 - (2-methyl-3-dimethylaminopropyl)-dibenzo[a,e]cycloheptatriene, B.P. 208–210°/0.1 mm.

EXAMPLE 27

5-(3-dimethylaminopropyl)-dibenzo[a,e]cycloheptatriene

As an alternative to the procedure described in Example 16, 5-(3-dimethylaminopropyl)-dibenzo[a,e]cycloheptatriene is prepared as follows:

A solution of 13.7 g. of 5-(3-dimethylaminopropylidene)-dibenzo[a,e]cycloheptatriene (prepared as described in Example 23) in 150 ml. of anhydrous ethanol is treated with hydrogen in a low pressure hydrogenation apparatus in the presence of 5 g. of 5% palladium or carbon catalyst. The mixture is shaken until the theoretical amount of hydrogen (0.05 M) is consumed. The catalyst is then removed by filtration and the solvent evaporated. The residue is then distilled in vacuo to yield 5-(3-dimethylaminopropyl)-dibenzo[a,e]cycloheptatriene, B.P. 196–198°/4 mm.

EXAMPLE 28

5-(3-dimethylaminopropyl)-dibenzo[a,e]-cycloheptatriene maleate

One gram of 5-(3-dimethylaminopropyl)-dibenzo[a,e]-cycloheptatriene is dissolved in 25 ml. of anhydrous ethyl acetate. To the solution is added a saturated solution of maleic acid in anhydrous ethyl acetate. The resulting solution is allowed to stand until crystallization occurs and is then heated on a steam bath for ½ hour. The solution is cooled in an ice-salt bath and the solid thereby formed collected by filtration. Recrystallization from ethanol-ether solution of the solid so collected yields 5-(3-dimethylaminopropyl) - dibenzo[a,e]cycloheptatriene maleate.

In a similar manner by substituting tartaric acid, succinic acid and citric acid in the above procedure there are respectively formed, 5-(3-dimethylaminopropyl)-dibenzo[a,e]cycloheptatriene tartrate, 5-(3-dimethylaminopropyl)-dibenzo[a,e]cycloheptatriene succinate, and 5-(3-dimethylaminopropyl) - dibenzo[a,e]cycloheptatriene citrate.

I claim:
1. 5-(3'-dimethylamino-2' - methylpropyl)dibenzo[a,d][1,4]-cycloheptadiene.

References Cited

UNITED STATES PATENTS

| | | | |
|---|---|---|---|
| 2,280,058 | 4/1942 | Bruson | 260—465 |
| 2,513,487 | 7/1950 | Hoffman et al. | 260—293 |
| 2,948,724 | 8/1960 | Sahyun et al. | 260—251 |
| 3,013,020 | 12/1961 | Fancher | 260—340.5 |
| 2,676,971 | 4/1954 | Cusic et al. | 360—207.5 |
| 2,739,984 | 3/1956 | Hafliger et al. | 260—570.5 |
| 2,649,444 | 8/1953 | Barret | 260—570.5 |

FOREIGN PATENTS

| | | |
|---|---|---|
| 618,034 | 2/1949 | Great Britain. |
| 736,372 | 9/1955 | Great Britain. |
| 627,139 | 7/1949 | Great Britain. |

OTHER REFERENCES

Tucker, "Journal Chem. Soc. London," 1952, pp. 803–7.

Experientia, vol. 5, pp. 201–202 (1949).

Battersby et al. Jour. Chem. Soc. (London), pp. 2888–2900 (1955).

Bull. Soc. Chim. (France), pp. 684–692 (1951).

CHARLES B. PARKER, *Primary Examiner.*

ROBERT V. HINES, *Assistant Examiner.*